(12) United States Patent
Li et al.

(10) Patent No.: US 9,146,337 B2
(45) Date of Patent: Sep. 29, 2015

(54) APPARATUS FOR SPECKLE REDUCTION, PULSE STRETCHING, AND BEAM HOMOGENIZATION

(71) Applicant: Applied Materials, Inc., Santa Clara, CA (US)

(72) Inventors: Jiping Li, Palo Alto, CA (US); Aaron Muir Hunter, Santa Cruz, CA (US); Bruce E. Adams, Portland, OR (US); Douglas E. Holmgren, Portland, OR (US); Samuel C. Howells, Portland, OR (US); Theodore P. Moffitt, Hillsboro, OR (US); Stephen Moffatt, St. Brelade (JE)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 14/137,592

(22) Filed: Dec. 20, 2013

(65) Prior Publication Data
US 2014/0254022 A1 Sep. 11, 2014

Related U.S. Application Data

(60) Provisional application No. 61/776,344, filed on Mar. 11, 2013.

(51) Int. Cl.
*G02B 27/10* (2006.01)
*G02B 3/00* (2006.01)
*G02B 27/48* (2006.01)

(52) U.S. Cl.
CPC .............. *G02B 3/0037* (2013.01); *G02B 27/48* (2013.01)

(58) Field of Classification Search
USPC ........................................ 359/619
See application file for complete search history.

(56) References Cited

U.S. PATENT DOCUMENTS

| 7,154,584 | B2 | 12/2006 | Okazaki |
| 2006/0066870 | A1 | 3/2006 | Korngut et al. |
| 2012/0080411 | A1* | 4/2012 | Mizuyama et al. ........ 219/121.6 |
| 2012/0275477 | A1 | 11/2012 | Berendt et al. |
| 2012/0325784 | A1 | 12/2012 | Moffatt et al. |

FOREIGN PATENT DOCUMENTS

JP 2008159348 A 7/2008

OTHER PUBLICATIONS

International Search Report and Written Opinion for International Application No. PCT/US2013/077128 dated Apr. 25, 2014, whole document.

* cited by examiner

*Primary Examiner* — James Jones
(74) *Attorney, Agent, or Firm* — Patterson & Sheridan, LLP

(57) ABSTRACT

Embodiments described herein relate to thermal processing of semiconductor substrates. More specifically, embodiments described herein relate to laser thermal processing of semiconductor substrates. In certain embodiments, a uniformizer is provided to spatially and temporally decorrelate a coherent light image.

18 Claims, 5 Drawing Sheets

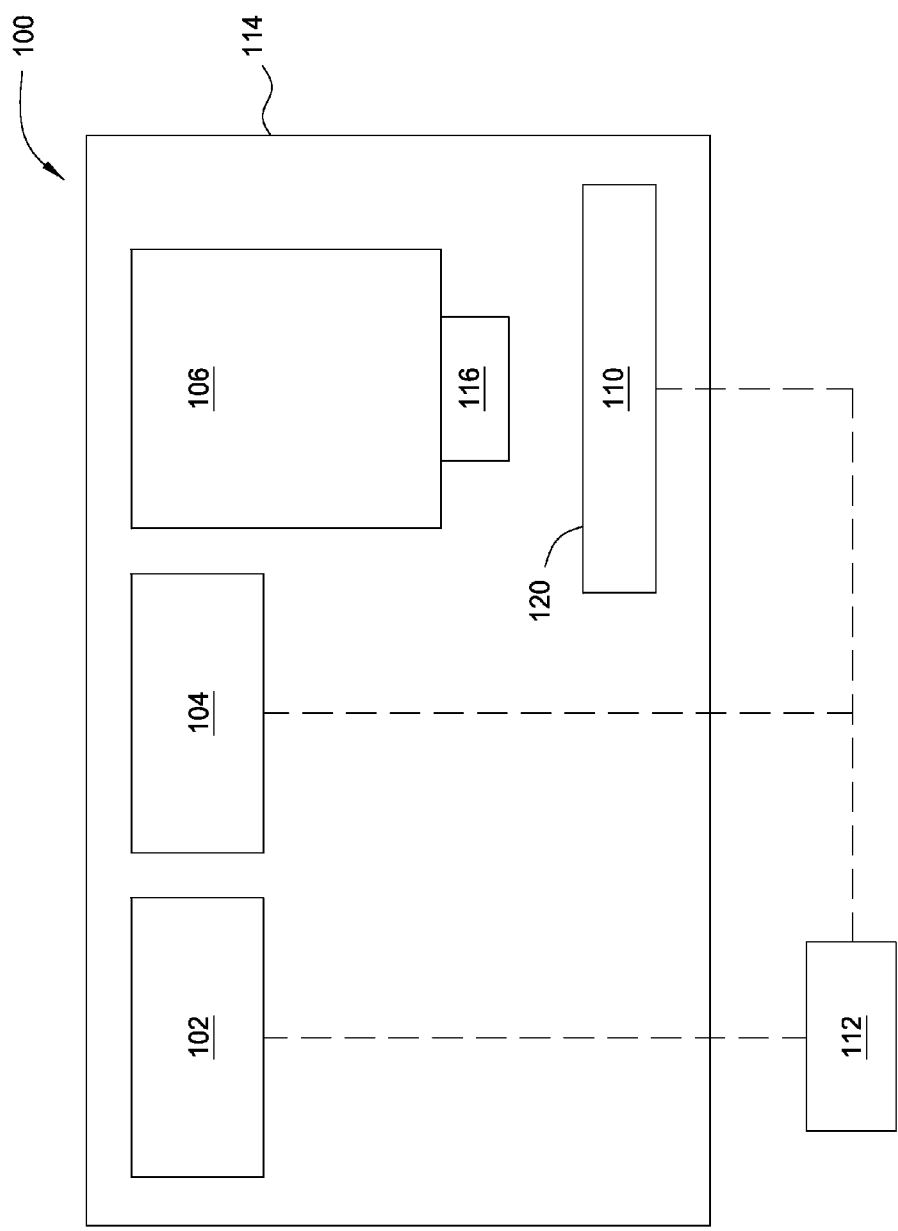

APPARATUS FOR SPECKLE REDUCTION, PULSE STRETCHING, AND BEAM HOMOGENIZATION

CROSS-REFERENCE TO RELATED APPLICATIONS

This application claims benefit of U.S. provisional patent application No. 61/776,344, filed Mar. 11, 2013, which is hereby incorporated by reference.

BACKGROUND

1. Field

Embodiments described herein relate to thermal processing of semiconductor substrates. More specifically, embodiments described herein relate to laser thermal processing of semiconductor substrates.

2. Description of the Related Art

In semiconductor manufacturing, thermal processes are commonly used to melt, anneal, crystallize, and activate dopants in semiconductor substrates. High power levels are generally used to process semiconductor substrates, and lasers are frequently used to achieve the high power levels. Lasers produce coherent light that has a non-uniform spatial distribution of energy. Depending on the structure of the lasing medium, the distribution will have local maxima and minima that result in higher and lower energy intensity, which leads to non-uniform processing of substrates. Moreover, the shape of the laser energy field is often different from the desired shape of the processing region.

Much work has been devoted to improving the uniformity of a laser energy field and adapting its shape to a desired geometry, with improvement roughly keeping pace with the shrinking scale of semiconductor devices. Further improvement is still needed, however, as the trend of miniaturization continues.

SUMMARY OF THE INVENTION

Embodiments described herein relate to thermal processing of semiconductor substrates. More specifically, embodiments described herein relate to laser thermal processing of semiconductor substrates. In certain embodiments, a uniformizer is provided to spatially and temporally decorrelate a coherent light image.

In one embodiment, an apparatus for improving energy uniformity of coherent light is provided. The apparatus comprises a first plurality of lenses positioned perpendicular to a propagation path of a coherent light image and a second plurality of lenses positioned in a plane substantially parallel to the first plurality of lenses. The apparatus further comprises a temporal decorrelator comprising a plurality of fibers positioned between the first plurality of lenses and the second plurality of lenses, wherein the plurality of fibers are adapted to temporally decorrelate the coherent light image. The spatial coherence of light exiting the second plurality of lenses is also reduced, thus improving energy uniformity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a schematic view of a thermal processing apparatus according to certain embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 2A:
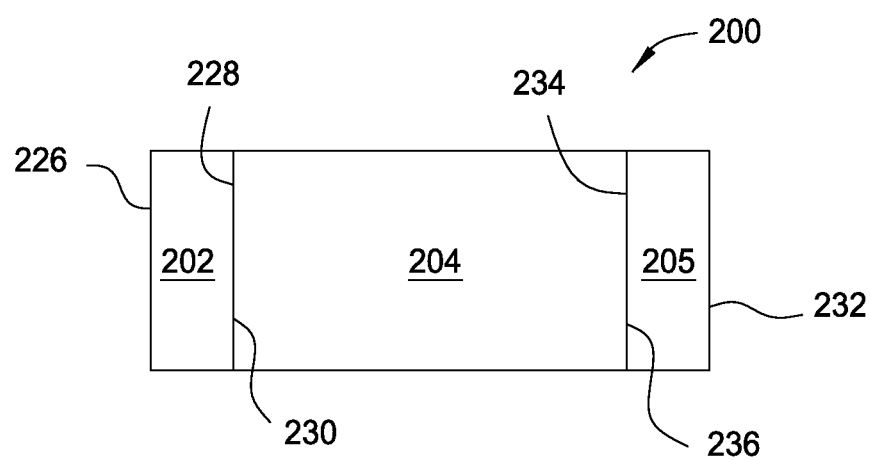
FIG. 2A is a schematic side view of a uniformizer according to certain embodiments.

Embodiments described herein relate to thermal processing of semiconductor substrates. More specifically, embodiments described herein relate to laser thermal processing of semiconductor substrates.

An embodiment of a thermal processing apparatus 100 is shown schematically in FIG. 1. An energy source 102, which may be a source of coherent light such as a laser, is disposed in an enclosure 114. The energy source 102 delivers energy to an optional combiner 104, used to combine energy beams from more than one generator of the energy source 102, in the event multiple generators are used. An energy beam proceeds from the combiner 104 into a uniformizer 106, which reorganizes the energy beam into a uniform energy beam, which is passed through an aperture 116 to give a desired field shape, and then to a work surface 120 of a stage 110. A substrate being processing is disposed on the work surface 120, and energy passing through the aperture 116 typically impinges the substrate in a substantially perpendicular orientation. The energy forms an energy field that covers a treatment area of the substrate. After a first treatment area is processed, the substrate is moved to expose a subsequent treatment area to the energy field by moving the stage 110. In one example, the stage 110 is a precision x-y stage. A controller 112 may be coupled to the stage 110 to control movement thereof, and to the energy source 102 and the combiner 104 to control energy delivery to the work surface 120. The apparatus 100 forms an energy field having a desired geometric shape and a highly uniform energy density distribution to promote uniform processing of all treatment areas on a substrate.

The energy source 102 may comprise a plurality of lasers. High power continuous wave or pulsed lasers are typically used. The laser energy may range from essentially unimodal energy ($M^2 \approx 1$) to highly modal energy ($M^2 > 30$) having hundreds or thousands of spatial modes. The laser energy from each generator may be collimated if et endue is large to prevent dispersive energy loss during optical processing. Pulsed lasers may have pulse durations from the femtosecond range to the microsecond range. In one embodiment, four q-switched, frequency-doubled, Nd:YAG lasers emitting 532 nm laser energy between 30 MW and 50 MW in pulses ranging from about 5 nsec to about 30 nsec per pulse with $M^2$ between about 10 and about 1000 may be used.

The energy from the energy source 102 may be directed to the combiner 104, if more than one generator is included in the energy source 102. The combiner 104 creates one energy beam or pulse from more than one energy beam or pulse. FIG.

Figure 3:
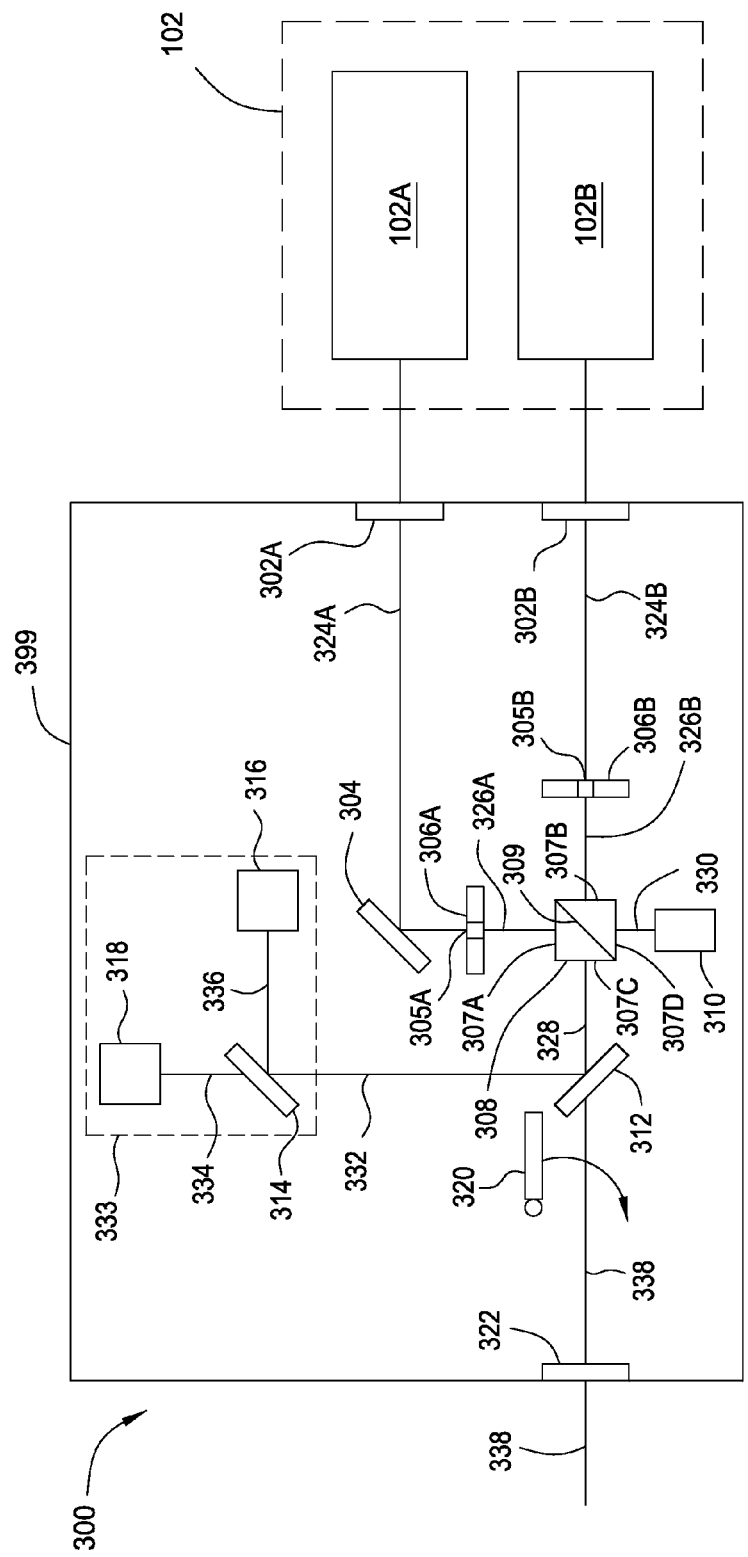
FIG. 3 is a plan view of a combiner according to certain embodiments.

3 is a plan view of a combiner 300, according to an embodiment, which may be used as the optional combiner 104. Using optics contained in an enclosure 399 to prevent light pollution, the combiner 300 combines a first input 324A received from the energy source 102 and a second input 324B received from the energy source 102 into one output 338. The two inputs 324A/B enter the combiner 300 through input lenses 302A and 302B disposed in openings of the enclosure 399. In the embodiment of FIG. 3, the two input lenses 302A/B are aligned along one surface of the enclosure 399, with the inputs 324/A/B entering the enclosure 399 in a substantially parallel orientation.

The two inputs 324A/B are directed to a combining optic 308 that combines the two pulses into one pulse 338. The combining optic has a first entry surface 307A oriented perpendicular to the entry path of a first directed input 326A and a second entry surface 307B oriented perpendicular to the entry path of a second directed input 326B to avoid any refraction of the directed inputs 326A/B upon entering the combining optic 308. The combining optic 308 is a crystal that has a selecting surface 309 oriented such that first and second directed inputs 326A/B each strike the selecting surface 309 at an angle of approximately 45°. The selecting surface 309 interacts with light selectively depending on the properties of the light. The selecting surface 309 of the combining optic 308 may reflect the first directed input 326A and transmit the second directed input 326B to create a combined output 328. To facilitate combination of the inputs, each of the directed inputs 326A/B may be tailored to interact with the selecting surface 309 in a particular way.

In one embodiment, the selecting surface 309 is a polarizing surface. The polarizing surface may have a linear axis of polarity, such that polarizing the directed input 326B parallel to the axis of the polarizing surface allows the directed input 326B to be transmitted by the polarizing surface, and polarizing the directed input 326A perpendicular to the axis of the polarizing surface allows the directed input 326A to be reflected by the polarizing surface. Aligning the two directed inputs 326A/B to the same spot on the polarizing surface creates the combined output 328 emerging from a first exit surface 307C of the combining optic 308 perpendicular to the surface 307C to avoid any refraction of the combined output 328. Alternately, the selecting surface 309 may be a circular polarizer, with the directed input 326A circularly polarized opposite the sense of the circular polarizer for reflection, and the directed input 326B circularly polarized in the same sense as the circular polarizer for transmission. In another embodiment, the directed inputs 326A/B may have different wavelengths, and the selecting surface 309 may be configured to reflect light of one wavelength and to transmit light of another wavelength, such as with a dielectric mirror.

In a polarization embodiment, polarization of the directed inputs 326A/B is accomplished using polarizing filters 306A/B. The polarizing filters 306A/B polarize the inputs 324A/B to be selectively reflected or transmitted by the selecting surface 309 of the combining optic 308. The polarizing filters 306A/B may be wave plates, for example half-wave plates or quarter-wave plates, with polarizing axes oriented orthogonal to each other to produce the orthogonally polarized light for selective reflecting and transmission at the selecting surface 309. The axis of each polarizing filter 306A/B may be independently adjusted, for example with rotational actuators 305A/B, to precisely align the polarization of the directed inputs 326A/B with the polarization axis of the selecting surface 309, or to provide a desired angle of deviation between the polarization axis of an input pulse 326A/B and the polarization axis of the selecting surface 309.

Adjusting the polarization axis of the directed inputs 326A/B controls intensity of the combined output 328, because a polarizing filter transmits incident light according to Malus' Law, which holds that the intensity of light transmitted by a polarizing filter is proportional to the incident intensity and the square of the cosine of the angle between polarization axis of the filter and polarization axis of the incident light. Thus, rotating the polarizing filter 306A so that the polarization axis of the polarizing filter 306A deviates from an orientation perpendicular to the polarization axis of the selecting surface 309 results in a portion of the directed input 326A being transmitted through the selecting surface 309. Likewise, rotating the polarizing filter 306B so that its polarization axis deviates from an orientation parallel to the axis of the selecting surface 309 results in a portion of the directed input 326B being reflected from the selecting surface 309. This "non-selected" light from each of the directed inputs 326A/B is combined into a rejected energy 330 that exits the combining optic 308 through a second exit surface 307D into an energy dump 310. In this way, each of the polarizing filters acts as a dimmer switch to attenuate the intensity of energy passing through the polarizing filters.

It should be noted that the two directed inputs 326A/B that are to be combined by the combining optic 308 are directed toward opposite sides of the selecting surface 309 for selective reflection and transmission. Thus, the first input 302A is directed along a path that brings the first input 302A toward a reflecting side of the selecting surface 309 by a reflector 304, while the second input 302B is directed toward transmitting side of the selecting surface 309. Any combination of reflectors may naturally be used to steer light along a desired path within the combiner 300.

The combined output 328 may interact with a first splitter 312 that splits the combined output 328 into the output 338 and a sample 332. The splitter 312 may be a partial mirror or a pulse splitter. The sample 332 may be directed to a diagnostic module 333 that analyzes properties of the sample 332 to represent properties of the output 338. In one embodiment, the diagnostic module 333 has two detectors 316 and 318 that detect the temporal shape of a sample and the total energy content of a sample, respectively. A second splitter 314 forms a first sub-sample 336 and a second sub-sample 334 for input to the respective detectors. The temporal shape detector 316 is an intensity monitor that signals intensity of energy striking the monitor in very short time scales. Energy pulses incident on the temporal shape detector may have total duration from 1 picosecond (psec) to 100 nsec, so a temporal shape detector suitable for registering a temporal shape on such time scales, which may be a photodiode or photodiode array, renders intensity signals at useful subdivisions of these time scales. The energy detector 318 may be a pyroelectric device, such as a thermocouple, that converts incident electromagnetic radiation to voltage that can be measured to indicate the energy content of the sub-sample 334. Because the first and second splitters 312 and 314 sample a known fraction of incident light based on the transmitting fraction of the first and second splitters 312 and 314, the energy content of the output 338 may be calculated from the energy content of the sub-sample 334.

Signals from the diagnostic module 333 may be routed to the controller 112 of FIG. 1, which may adjust operation of the energy source 102 or the combiner 300 to achieve desired results. The controller 112 may adjust an electronic timer coupled to an active q-switch of each laser (in a laser embodiment) to control pulse timing in response to results from the temporal shape detector 316. Cycling the active q-switch faster makes shorter pulses, and vice versa. The controller 112 may be coupled to the rotational actuators 305A/B to adjust the intensity of the output 338, based on results from the energy detector 318, by adjusting the polarization angle of light passing through the polarizing filters 306A/B. In this way, the duration and energy content of the output 338 may be independently controlled. The controller 112 may also be configured to adjust power input to each laser.

The output 338 may be interrupted by a shutter 320, if desired. The shutter 320 may be provided as a safety device in the event the laser energy, or other intense energy, emerging from the combiner 300 is to be interrupted to make an adjustment to a component subsequent to the combiner 300. The output 338 exits the combiner 300 through an output lens 322.

The output 338 is a combination of the two directed inputs 326A/B. As such the output 338 has properties that represent a combination of the properties of the two directed inputs 326A/B. In the polarization example described above, the output 338 may have an elliptical polarization representing the combination of two orthogonally polarized directed inputs 326A/B having different intensities according to the degree of transmission/reflection of each of the directed inputs 326A/B at the selecting surface 309. In an example using incident wavelength at the selecting surface 309 to combine two inputs, the output 338 will have a wavelength representing the combined wavelength of the two directed inputs 326A/B according to their respective intensities.

For example, a 1,064 nm reflecting dielectric mirror may be disposed at the selecting surface 309 of the combining optic 308. The directed input 326A may have wavelength of approximately 1,064 nm with intensity A for reflecting from the selecting surface 309, and the directed input 326B may have a wavelength of 532 nm with intensity B for transmitting through the selecting surface 209. The combined output 328 will be a co-propagating bi-pulse of two photons having the wavelengths and intensities of the directed inputs 326A/B, with total energy content that is the sum of the two pulse energies.

The combiner 300 of FIG. 3 may be used to combine two inputs into one output. Optical combiners comprising similar elements in different configurations may be used to further combine outputs from the combiner 300, if desired. For example, a pair of combiners such as the combiner 300 may combine four inputs into two intermediates based on polarization, and a third combiner may combine the two intermediates into one output based on wavelength.

Energy from the optional combiner 104 (or directly from the energy source 102) is directed to the uniformizer 106. FIG. 2A is a plan view of a uniformizer 200, according to one embodiment, which may be used as the uniformizer 106 in the apparatus 100 of FIG. 1. The uniformizer 200 comprises a first spatial decorrelator 202, a second spatial decorrelator 205, and a temporal decorrelator 204. The decorrelators 202, 205, and 204 are shown schematically in FIG. 2A to illustrate where the spatial decorrelators 202 and 205 are positioned in relation to the temporal decorrelator 204 along the optical path. In certain embodiments, the first spatial decorrelator 202 is positioned prior to the temporal decorrelator 204 and the second spatial decorrelator 205 is positioned subsequent to the temporal decorrelator 204 along the optical path. The decorrelators 202, 205, and 204 may be in physical contact, as suggested in FIG. 2A, or they may be spaced apart if desired to allow propagation through a different medium for some distance between the decorrelators 202, 205, and 204.

The first spatial decorrelator 202 mixes energy from various areas of a cross-sectional image incident on a first receiving surface 226 of the first spatial decorrelator 202. Each component area of the cross-sectional image is projected into a larger field, in some cases onto the entire resultant image field, to create a composite image of the component areas transmitted from a first transmission surface 228 of the first spatial decorrelator 202. Spatial modes present in the incident energy are overlapped in the resulting composite image to produce a spatially uniformized image. Local intensity maxima and minima are superimposed to reduce prevalence of the spatial modes and energy distribution non-uniformity arising from spatial modes.

The temporal decorrelator 204 reduces temporal correlation of energy incident on a second receiving surface 230 of the temporal decorrelator 204 to produce a decorrelated image transmitted from a second transmission surface 234 of the temporal decorrelator 204. The decorrelated image is phase-uniformized relative to the incident energy to reduce interference patterns associated with temporally coherent energy. The temporal decorrelator 204 generally directs the incident energy through multiple different path lengths, or propagation lengths, to decorrelate the incident energy.

The second spatial decorrelator 205 mixes energy received from the temporal decorrelator 204 at a third receiving surface 236 of the second spatial decorrelator 205. Each component area of the cross-sectional image is projected into a larger field, in some cases onto the entire resultant image field, to create a composite image of the component areas transmitted from the second transmission surface 234 of the temporal decorrelator 204. Spatial modes present in the incident energy are overlapped in the resulting composite image to produce a spatially uniformized image. Local intensity maxima and minima are superimposed to reduce prevalence of the spatial modes and energy distribution non-uniformity arising from spatial modes. Energy from the second spatial decorrelator 205 is transmitted from a third transmission surface 232 to the aperture 116 to form a uniform field shape having a uniform energy distribution.

Figure 2B:
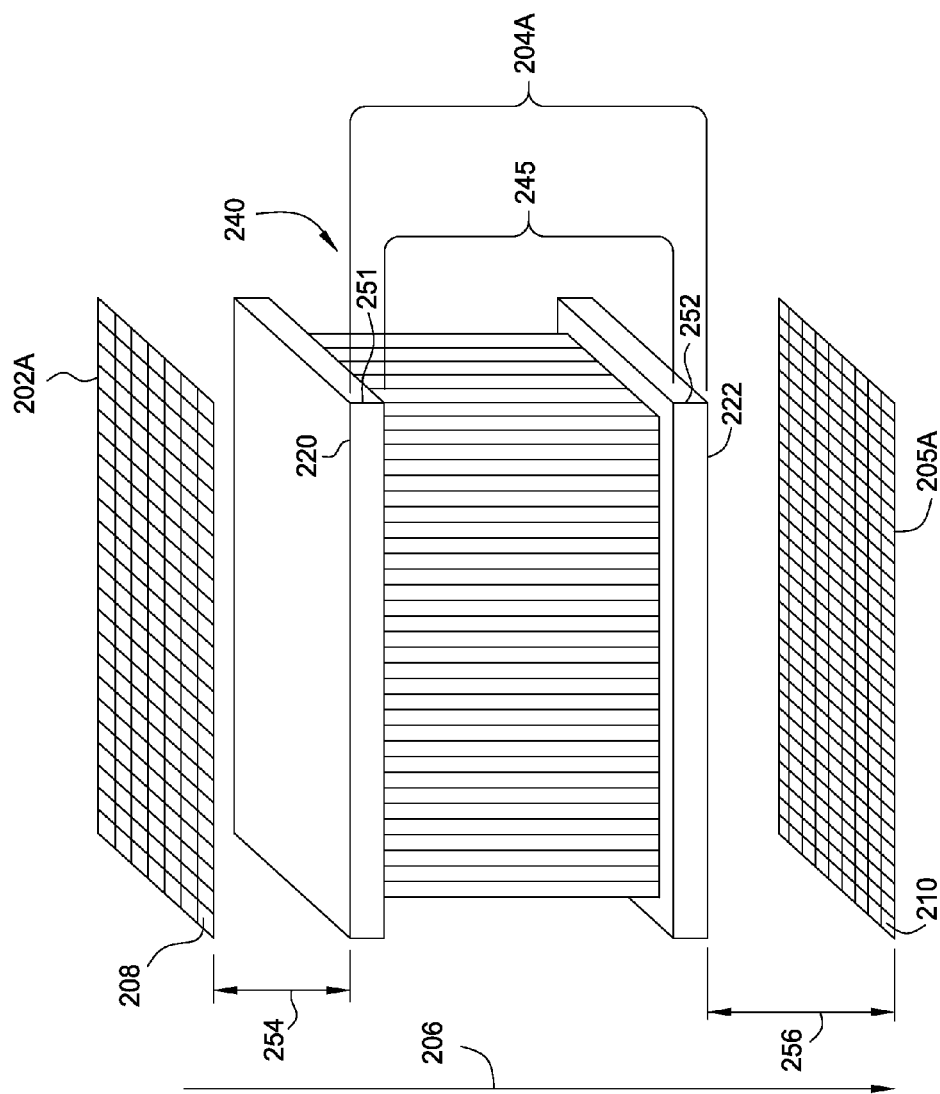
FIG. 2B is a perspective view of a uniformizer according to certain embodiments.

FIG. 2B is a perspective view of a uniformizer 240 according to certain embodiments. The uniformizer 240 has a first plurality of lenses 202A and a second plurality of lenses 205A, each of which may be a microlens array, arranged in intersection with the propagation path 206 of an input energy. In one embodiment, the first plurality of lenses 202A may be the first spatial decorrelator 202 described with regard to FIG. 2A and the second plurality of lenses 205A may be the second spatial decorrelator 205 described with regard to FIG. 2A.

The first plurality of lenses 202A and second plurality of lenses 205A are disposed along a plane that is substantially perpendicular to the propagation path 206 of the input energy. Each lens 208 of the first plurality of lenses 202A receives a portion of the input energy and projects that portion onto a composite image with an area larger than the area of the received portion of the incident energy. Thus, a portion of the image from one lens 208 overlaps with a portion of each of the images from every other lens 208 to form the composite image. The composite image thus formed may have a central region that has higher intensity and/or spatial uniformity than a peripheral region of the composite image, depending on the characteristics of the lenses 208 and the arrangement of the first plurality of lenses 202A.

It should be noted that certain embodiments may have any desired cross-sectional shape, such as circular, elliptical, square, hexagonal, or other polygonal and/or irregular shapes. Additionally, in some embodiments, the plane of the first plurality of lenses 202A may be angled with respect to the propagation path 206 of the input energy. Alternately, the lenses 208 may be staggered, which is to say that each lens 208 may be located some distance from a datum plane, and the distance of each lens 208 from the datum plane may be different. Such an embodiment may provide added spatial uniformization by passing portions of the transmitted image of most of the lenses 208 through another lens to produce the spatially uniformized image. Also, certain embodiments may have only partial overlap of images.

The first plurality of lenses 202A is shown in FIG. 2B as disposed along a surface that defines a plane perpendicular to the propagation path 206 of the input energy. In alternate embodiments, the first plurality of lenses 202A may be disposed along a surface that defines a curve with a locus of curvature located on the axis of the propagation path 206 of the incident energy on the transmitting side of the first plurality of lenses 202A. Such a configuration may be useful in reducing dispersion of light from the first plurality of lenses 202A in embodiments having a first distance 254 between the first plurality of lenses 202A and a receiving region 220 of the temporal decorrelator 204A. In embodiments having no space between the first plurality of lenses 202A and the temporal decorrelator 204A, dispersive energy may be reflected by the refractive edges of the temporal decorrelator 204A, or a reflective material may surround one or both of the first plurality of lenses 202A and a temporal decorrelator 204A. The first distance 254 between the first plurality of lenses 202A and the receiving region 220 of the temporal decorrelator 204A may be adjusted to provide for a desired degree of dispersion of light at the receiving region 220.

The first plurality of lenses 202A is shown in FIG. 2B as being part of a unitary object. Alternately, one or more of the lenses 208 may be detached from the other lenses 208, if desired. Using a plurality of detached lenses may be helpful in embodiments where adjusting the lenses from time to time improves performance. The lenses 208 may also be detached if, as described above, the lenses are different distances from a datum plane.

The composite image from the first plurality of lenses 202A passes to the receiving region 220 of the temporal decorrelator 204A. The temporal decorrelator 204A is a refractive medium that comprises a plurality of fibers 245. In certain embodiments, the fibers 245 may be single fibers, fiber bundles, or combinations thereof. A plurality of structural elements 251 and 252 may be provided to structure the plurality of fibers 245 across the propagation path 206 of the input energy. In one embodiment, a first structural element 251 is disposed a first distance 254 from the first plurality of lenses 202A. The structural elements 251 and 252 may be disposed substantially outside of an area occupied by the image so as to not interfere with the propagation path 206 of the input energy (See FIG. 2C). In this embodiment, the structural elements 251 and 252 form a perimeter around the fibers 245 at the receiving region 220 and a transmission region 222, respectively. The structural elements 251 and 252 may be formed from a material suitable for use in the optical system 100. Although not shown, additional structural elements, such as pillar elements, may provide structure to the fibers 245 at locations between the first structural element 251 and the second structural element 252. In this embodiment, the input energy is propagated through the fibers 245 and the additional structural elements do not affect the propagation of light through the temporal decorrelator 204A. In another embodiment, the fibers 245 may be encased in a structuring material, such as a polymer material suitable for use in an optical system or other suitable materials, which substantially surrounds and supports each of the fibers 245 by occupying areas between the fibers 245.

The fibers 245 generally have a core made of a transparent material surrounded by a cladding material which has a lower index of refraction than the core material. However, it is contemplated fibers with characteristics other than those described above may be used. As will be discussed in more detail below, the fibers 245 may exhibit different, lengths, thicknesses, and different optical properties which are selected to increase the temporal decorrelation of light propagating through the temporal decorrelator 204A.

Light enters a receiving region 220 of the temporal decorrelator 204A and propagates through the fibers 245 where the light exits via a transmission region 222. Each of the fibers 245 has a propagation length, which may be the same or different from other fibers 245. The propagation length may be defined as the length of the fibers 245 from the receiving region 220 to the transmission region 222. Energy entering the receiving region 220 of the fibers 245 propagates through the refractive medium of each of the fibers 245 to the transmission region 222. Coherent light that travels different propagation lengths through the fibers 245 will emerge phase-decorrelated provided the difference in path length is not an integer multiple of the wavelength of the coherent light. If the different propagation lengths are different in length by an amount greater than a coherence length, sometimes represented as the speed of light divided by pi and the optical bandwidth, of the incident energy, decorrelation is improved. Temporal decorrelation may be achieved by forcing light to propagate over a given distance at different velocities, either by propagating difference distances through a refractive medium, by traveling the same distance through different refractive media, or any combination thereof. Generally, light travels at approximately 1 ft per nanosecond. Individual fibers 245 or fiber bundles can be arranged to have a widely distribution of propagation lengths to create laser pulses stretched beyond the laser source's original pulse width. The resulting temporal decorrelation results in light that is segmented into portions of light where each portion of light is delayed by different amounts of time. When the portions of light are recombined at the second plurality of lenses 205A, a broader laser pulse in time is formed. The distribution of fiber 245 propagation lengths may be be selected to provide a Gaussian shaped broad laser pulse or a flat-top shaped broad laser pulse.

In certain embodiments, a first fiber may have a first refractive material and a second fiber may have a second refractive material different from the first refractive material. The first fiber may have a first propagation length having a first length and the second fiber may have a propagation length having a second length different than the first length. Embodiments of the invention utilize the combination of different refractive materials and propagation lengths between individual fibers or bundles of fibers to provide for improved temporal decorrelation as described above.

Figure 2C:
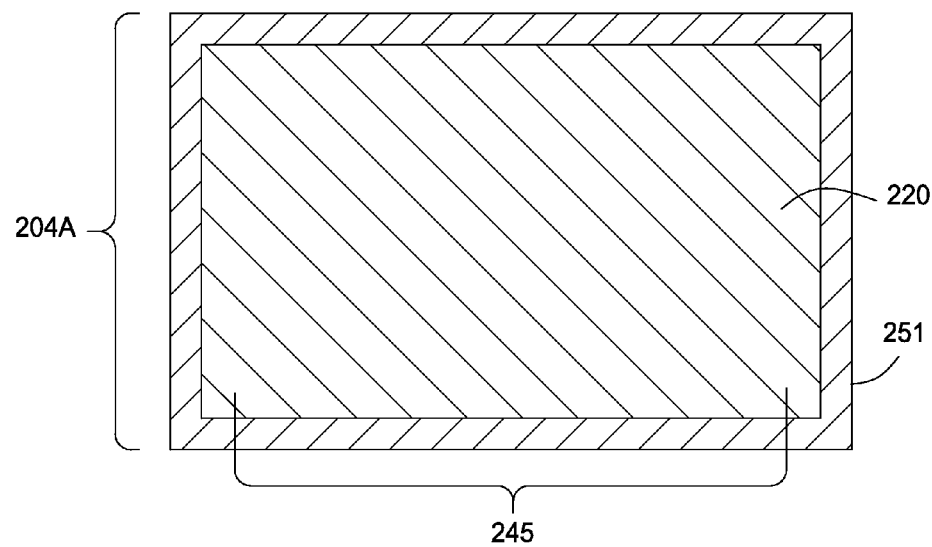
FIG. 2C is a plan view of a receiving surface of a temporal decorrelator according to certain embodiments.

Referring now to FIG. 2C, a plan view of the receiving region 220 of the temporal decorrelator 204A is shown. The first structural element 251 structures the fibers 245 perpendicular to the propagation path 206 of light through the temporal decorrelator 204A. The receiving surface 220 generally receives light from the first plurality of lenses 202A as described above. The receiving surface 220 of the temporal decorrelator 204A may be planar, and the receiving ends of the fibers 245 may be arranged in a substantially planar arrangement. Alternately, the receiving ends of the fibers 245 may extend beyond the first structural elements 251 towards the first plurality of lenses 202A. In certain embodiments, the receiving ends of individual fibers 245 may be disposed at different distances from the first plurality of lenses 202A across the receiving region 220.

Referring back to FIG. 2B, light entering the receiving region 220 travels through the fibers 245 to the transmission region 222 of the temporal decorrelator 204A. A second structural element 252 may be disposed at a second distance 256 from the second plurality of lenses 205A. Similar to the embodiments described in regard to FIG. 2C, the fibers 245 may form a uniform planar surface at the transmission region 222, or the transmission ends of the fibers 245 may extend beyond the second structural element 252 towards the second plurality of lenses 205A. In certain embodiment, the transmission ends of individual fibers 245 may be disposed at different distances from the second plurality of lenses 205A across the transmission region 222.

The second plurality of lenses 205A may be disposed along a plane that is substantially perpendicular to the propagation path 206 of the input energy. Each lens 210 of the second plurality of lenses 205A receives a portion of the energy propagated through the fibers 245 of the temporal decorrelator 204A and projects that portion onto a composite image with an area larger than the area of the received portion of the incident energy. Thus, a portion of the image from one lens 210 overlaps with a portion of each of the images from every other lens 210 to form the composite image. The composite image thus formed may have a central region that has higher intensity and/or spatial uniformity than a peripheral region of the composite image, depending on the characteristics of the lenses 210 and the arrangement of the second plurality of lenses 205A. It is also contemplated that partial image overlay may be present in the composite image.

It should be noted that in certain embodiments, the first plurality of lenses 202A and the second plurality of lenses 205A, may have any desired cross-sectional shape, such as circular, elliptical, square, hexagonal, or other polygonal and/or irregular shapes. Additionally, the plane of the second plurality of lenses 205A may be angled with respect to the propagation path 206 of the input energy. Alternately, the lenses 210 may be staggered, which is to say that each lens 210 may be located some distance from a datum plane, and the distance of each lens 210 from the datum plane may be different. Staggered lenses may provide added spatial uniformization by passing portions of the transmitted image of most of the lenses 210 through another lens to produce the spatially uniformized image. In other embodiments, the concavity or convexity of lenses 208 of the first plurality of lenses 202A and the lenses 210 of the second plurality of lenses 205A may be the same or different. In one embodiment, the sizes, or area of the lenses 210 may be different from other lenses 210 in the second plurality of the lenses 205A. For example, the size of a lens 208 in the first plurality of lenses 202A may be matched to the size of a corresponding lens 210 of the second plurality of lenses 205A. In this way, light may propagate through a single fiber or bundle of fibers 245 from a lens 208 of the first plurality of lenses 202A that matches the size of a corresponding lens 210 of the second plurality of lenses 205A.

The image formed by the second plurality of lenses 205A is spatially and temporally decorrelated which provides for a reduced coherence of the light present in the resulting image, and thus, a more uniform energy distribution over the image. The image further propagates through the system 100 (FIG. 1) to the aperture 116 where the light may be altered to provide desired characteristics for thermal processing of substrates.

While the foregoing is directed to embodiments of the present invention, other and further embodiments of the invention may be devised without departing from the basic scope thereof, and the scope thereof is determined by the claims that follow.

The invention claimed is:

1. An apparatus, comprising:
   a first microlens array in a propagation path of an input energy;
   a second microlens array in the propogation path of the input energy; and
   a temporal decorrelator comprising a plurality of fibers positioned between the first microlens array and the second microlens array, wherein the first microlens array and the second microlens array are in physical contact with the temporal decorrelator.

2. The apparatus of claim 1, wherein the first microlens array is positioned perpendicular to the propagation path of the input energy.

3. The apparatus of claim 2, wherein the second microlens array is positioned in a plane parallel to the first microlens array.

4. The apparatus of claim 1, wherein the first microlens array is positioned prior to the temporal decorrelator in the propagation path of the input energy.

5. The apparatus of claim 1, wherein the first microlens array focuses a coherent light image onto the temporal decorrelator.

6. The apparatus of claim 5, wherein the second microlens array receives a temporally decorrelated light image from the temporal decorrelator.

7. The apparatus of claim 1, wherein the first microlens array and the second microlens array comprise a plurality of microlenses having substantially equal dimensions.

8. The apparatus of claim 7, wherein the plurality of microlenses of the first microlens array are disposed within a single plane.

9. The apparatus of claim 7, wherein the plurality of microlenses of the second microlens array are disposed within a single plane.

10. The apparatus of claim 7, wherein the plurality of microlenses of the first microlens array and the second microlens array are staggered with respect to a first datum plane and a second datum plane, respectively.

11. The apparatus of claim 1, wherein the plurality of fibers comprise fibers of varying lengths.

12. An apparatus, comprising:
    a first microlens array positioned perpendicular to a propagation path of a coherent light image;
    a second microlens array positioned parallel to the first microlens array;
    a temporal decorrelator comprising a plurality of fibers positioned between the first microlens array and the second microlens array; and
    an aperture positioned beyond the second microlens array in a propagation path of an incoherent light image.

13. The apparatus of claim 12, wherein the plurality of fibers comprise fibers of varying lengths.

14. The apparatus of claim 12, wherein the first microlens array and the second microlens array comprise a plurality of microlenses having substantially equal dimensions.

15. The apparatus of claim 14, wherein the plurality of microlenses of the first microlens array are disposed within a single plane.

16. The apparatus of claim 14, wherein the plurality of microlenses of the second microlens array are disposed within a single plane.

17. The apparatus of claim 14, wherein the plurality of microlenses of the first microlens array and the second microlens array are staggered with respect to a first datum plane and a second datum plane, respectively.

18. An apparatus, comprising:
a first microlens array positioned perpendicular to a propagation path of a coherent light image;
a second microlens array positioned parallel to the first microlens array;
a temporal decorrelator positioned between the first microlens array and the second microlens array and optically coupling the first microlens array and the second microlens array, the temporal decorrelator comprising a plurality of fibers having varying lengths; and
an aperture positioned beyond the second microlens array in a propagation path of an incoherent light image.

* * * * *

UNITED STATES PATENT AND TRADEMARK OFFICE
CERTIFICATE OF CORRECTION

PATENT NO. : 9,146,337 B2  
APPLICATION NO. : 14/137592  
DATED : September 29, 2015  
INVENTOR(S) : Li et al.

Page 1 of 1

It is certified that error appears in the above-identified patent and that said Letters Patent is hereby corrected as shown below:

Specification

In Detailed Description:

Column 2, Line 56, please delete "et endue" and insert -- etendue -- therefor.

Signed and Sealed this  
Twenty-second Day of March, 2016

Michelle K. Lee  
*Director of the United States Patent and Trademark Office*